(12) United States Patent
Bogrash (10) Patent No.: US 10,442,525 B2
(45) Date of Patent: Oct. 15, 2019

(54) ROTOR OR PROPELLER BLADE WITH DYNAMICALLY VARIABLE GEOMETRY AND OTHER PROPERTIES

(71) Applicant: Philip Bogrash, Ashdod (IL)

(72) Inventor: Philip Bogrash, Ashdod (IL)

(73) Assignee: Optivector Ltd, Raanana (IL)

( * ) Notice: Subject to any disclaimer, the term of this patent is extended or adjusted under 35 U.S.C. 154(b) by 294 days.

(21) Appl. No.: 15/149,099

(22) Filed: May 7, 2016

(65) Prior Publication Data

US 2017/0320562 A1 Nov. 9, 2017

(51) Int. Cl.
| | |
|---|---|
| *B64C 11/18* | (2006.01) |
| *B64C 11/20* | (2006.01) |
| *B63H 1/04* | (2006.01) |
| *B63H 1/08* | (2006.01) |

(52) U.S. Cl.
CPC ............... *B64C 11/18* (2013.01); *B63H 1/04* (2013.01); *B63H 1/08* (2013.01); *B64C 11/20* (2013.01); *F05B 2240/31* (2013.01); *Y02E 10/721* (2013.01)

(58) Field of Classification Search
CPC ... Y02E 10/721; F05B 2240/31; B64C 11/18; B64C 11/003; B63H 1/26
See application file for complete search history.

(56) References Cited

U.S. PATENT DOCUMENTS

| | | | | |
|---|---|---|---|---|
| 4,247,066 A * | 1/1981 | Frost | .......................... | B64C 3/48 244/219 |
| 5,265,827 A * | 11/1993 | Gerhardt | ............... | B64C 39/005 244/20 |
| 7,384,016 B2 * | 6/2008 | Kota | ....................... | B63B 1/285 244/123.1 |
| 7,632,068 B2 * | 12/2009 | Bak | ....................... | F03D 1/0641 416/132 B |
| 7,922,450 B2 * | 4/2011 | Narasimalu | ........... | F03D 1/0675 416/132 B |
| 8,192,169 B2 * | 6/2012 | Piasecki | ................... | B23P 15/04 416/226 |
| 8,783,604 B2 * | 7/2014 | Sanderson | ................ | B64C 3/56 244/123.1 |
| 8,814,101 B2 * | 8/2014 | Hetrick | ..................... | B64C 3/48 244/219 |
| 9,086,054 B2 * | 7/2015 | Loh | ....................... | F03D 1/0641 |
| 9,139,298 B2 * | 9/2015 | Gates | .................... | B64C 27/615 |
| 9,759,191 B2 * | 9/2017 | Betran Palomas | ... | F03D 7/0232 |
| 9,816,384 B2 * | 11/2017 | Birkestrand | .............. | F01D 7/00 |

(Continued)

*Primary Examiner* — Michael C Zarroli (57) ABSTRACT

A blade for the cycloidal marine propellers or cycloidal aerial rotors operative, in response to control system commands, to dynamically; flex along its chord, vary its relative pivot point position, change its planform by extending or retracting a trailing edge extension, differentially, turn the flap along the trailing edge in either direction or allow it to be turned by the flows. For the reversal of the leading and trailing edges for operation in reverse airflow and other conditions the blades are provided with edges that can be made rigid when functioning as the leading edge and flexible if needed when functioning as the trailing edge. Also, the blades are configured to vary and reshape their cross-sectional profile thickness. Finally, the blades are given on command flow permeability along much of their surface.

8 Claims, 5 Drawing Sheets

(56) References Cited

U.S. PATENT DOCUMENTS

| | | | | |
|---|---|---|---|---|
| 2001/0052287 | A1* | 12/2001 | Perez | B64C 13/40 |
| | | | | 92/90 |
| 2002/0100842 | A1* | 8/2002 | Perez | B64C 3/48 |
| | | | | 244/219 |
| 2009/0226314 | A1* | 9/2009 | Bogrash | F03D 5/00 |
| | | | | 416/111 |
| 2010/0259046 | A1* | 10/2010 | Kota | F03D 1/0641 |
| | | | | 290/44 |
| 2012/0269632 | A1* | 10/2012 | Westergaard | F03D 1/0641 |
| | | | | 416/159 |
| 2016/0376003 | A1* | 12/2016 | Feldman | B64C 39/005 |
| | | | | 703/2 |

* cited by examiner

ROTOR OR PROPELLER BLADE WITH DYNAMICALLY VARIABLE GEOMETRY AND OTHER PROPERTIES

This application claims the benefit of Provisional Patent Application 62/159,231 filed on May 9, 2015.

1. FIELD OF THE INVENTION

This invention relates to blades for the cycloidal propellers and rotors and especially to the blades for the non-circular orbiting cycloidal rotors and propellers.

2. DESCRIPTION OF THE PRIOR ART

At the present time the known blades for the orbiting cycloidal propellers and rotors, such as for example described in the U.S. Pat. No. 8,540,485, are of fixed cross-sectional shape. However the patent application PCT/IL2013/050755 for a rotor or propeller featuring the independent from the other blades in terms of the trajectory and in terms of speed, largely unconstrained by the rotor structure blades' motion (hereinafter free blade motion) does also describe the blades designed to be cross-sectionally flexible by means of being provided either with the hinges running along the length of the blade span or making the blades cross-sectionally flexible by means of using the flexible materials such as elastomers. The blades cross-sectional shape dynamic variability is useful for providing fishtail-type or indulating thruster-type propulsion and will be useful for other purposes such as for example the controlled generation and shedding of the trailing edge vortex and dynamically optimizing the blade shape to correspond to different operating conditions along the blade orbit. In the above referenced patent application the blades are flexed by means of the magnetic force vectors acting on the magnetic footers mounted on the blades ends. Thus the blades are cross-sectionally flexed by means of the external forces acting on the blades. This kind of an electromagnetic propeller or rotor does have that capability, however the known cycloidal rotors or propellers do not, whereas the benefits of the dynamic cross-sectional blade shape variability would be highly desirable for them as well. With the exception of the above referenced patent application there is nothing in the art related to cycloidal propellers and rotors featuring the dynamic blade pivot point location variability. The said patent application describes the variability of the virtual pivot point location along the blade chord, but does not describe the variability of a physical pivot point relative location and that feature is not findable in the prior art. Dynamically changing planforms are known for the variable geometry airplane wings, but not for the blades of cycloidal rotors and propellers and for the latter they are needed for a different set of reasons—the need to vary the size of the trailing edge vortex and to dynamically control along the blade orbit the current location of each blade's trailing edge and thereby the location of the trailing edge vortex and its shed flows. Turnable trailing edge flaps have long been a feature of the fixed wings of airplanes and of helicopter rotor blades, but not of the said rotor and propeller blades where they will be highly useful for generating the trailing edge vortexes and controlling their size and controllably shedding them or either avoiding or minimizing their generation in parts of the blade trajectory where that would be counter-productive or for using fishtail type propulsion by the blade. The leading edge slats and slots are known as the feature of the fixed wings of airplanes and are used for lift enhancement and stall prevention, but the "on" or "off" largely unobstructed flow permeability of the said rotor and propeller blades over much of their surface and especially the trailing part of the blade to negate the effects of strong localized cross-trajectory flows and/or the effect of a difference in dynamic pressure on opposing sides when its counterproductive, used over parts of the blade trajectory within each revolution of a rotor or propeller when needed, has a completely different reason for being, different structure and is not findable in the prior art. Providing flexible trailing edges is known for example in helicopter rotors, but providing more than one of them on different sides or the same side of the blade pivot point oriented for flexing either in the same or opposite directions, equipping them with structural elements of dynamically variable stiffness up to the point of rigidity would be highly useful for certain types of cycloidal rotor or propeller operation where the aero-elastic or hydro-elastic effects respectively have importance comparable to that of conventional lift generation and is not findable in the prior art. The ability to switch between the rigid and flexible status of the leading and trailing edges when the roles of said leading and trailing edges are reversed for operation in the regime of reverse airflow and in other cases is highly desirable, but is also not findable in the prior art. Varying the blade's cross-sectional profile thickness when the leading and trailing edges are reversed and in other cases is useful and is not findable in the prior art.

3. OBJECTS AND ADVANTAGES

One object is to provide the blades for the cycloidal propellers and the cycloidal rotors of any kind, with the means for blade based powered flexing of blades cross-sectional shape dynamically.

Another object is to provide the blades for the above referenced propellers and rotors with the capability of dynamically changing their physical pivot point location along the blade chord for controlling the relative sizes of the leading and trailing edge vortexes.

Another object is to provide the blades for said propellers and rotors with the ability to dynamically change the blade's planform by means of extending or retracting a trailing edge extension, which may be extended differentially at the two ends of the blade depending on the current aerodynamic or hydrodynamic regime respectively at each end, for controlling the size, shape along the span, movement along the span, generation and shedding of the trailing edge vortex.

Another object is to provide the blades for said propellers and rotors with the trailing edge flap dynamically turnable either by the flows or powered turning in either direction for the purpose of handling the trailing edge vortex and other flows affecting the trailing edge.

Another object is to provide the blade for said propellers and rotors with at least one flexible edge and to make said edges' stiffness variable dynamically, and optionally differentially along the blade span, in real time for better control of the hydro-elastic or aeroro-elastic effects respectively.

Another object is to provide the blades with the ability to change their profile cross-section thickness and shape accordingly when the leading and trailing edges are reversed for operation in the regime of reverse airflow or other conditions calling for such changes of blade's cross-section.

Another object is to enable, when reversing the leading and trailing edges of the blade, making its heretofore rigid leading edge flexible and its heretofore flexible trailing edge rigid for their role reversal.

Another object is to provide for much of the blade and especially its trailing part on demand cross-blade flow permeability to be initiated or stopped by the control system at the appropriate locations along blade trajectory in order to be able to negate the effects of strong localized cross-trajectory flows or the effect of a difference in dynamic pressure on opposing surfaces of the blade when it's counterproductive.

5. DESCRIPTION OF THE PREFERRED EMBODIMENTS

Figure 1:
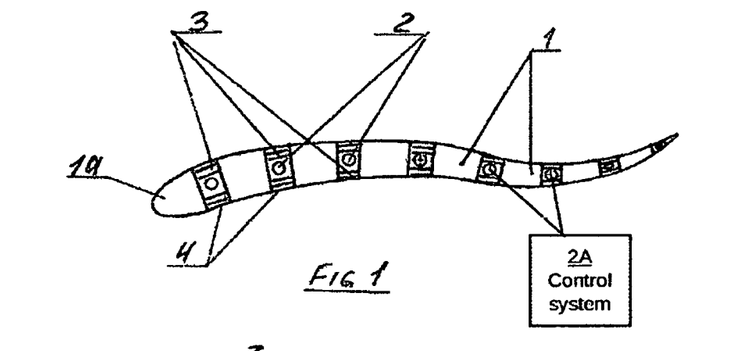
FIG. 1 is a view of the blade equipped with built-in linear actuators for changing the relative angular positions of the adjacent segments thereby varying its cross-sectional shape dynamically.
Figure 2:
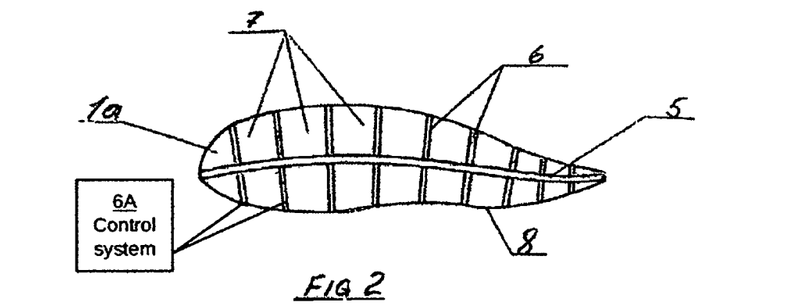
FIG. 2 is a view of the blade featuring an elastically flexible plate with installed on it, between partition plates, size varying electro-active polymer segments changing their sizes upon the application of voltage thereby dynamically flexing the blade's cross-sectional shape.

First embodiment of this invention (FIG. 1) is a blade (1*a*) comprising a number of parallel segments (1) which are connected either by hinges (2) or by flexible links thereby forming a cross-sectionally flexible surface. Possible configurations of this blade may comprise segments of unequal dimensions along the chord with, for example the first segment starting from the leading edge being the longest. Said segments will have plates to which will be attached, spanning the gap between said segments, miniature where appropriate, actuators (3) such as for example very fast acting electro-active polymer actuators, piezo-electric crystal stack actuators or the amplified piezo-electric actuators for the airfoil blades and for much slower moving hydrofoil blades for example the electro-magnetic actuators, electro-active polymer actuators or the smart memory alloy-based actuators. Over the gap the elastic flaps (4), extending from one segment to the segment following it, can be provided. Said flap can be made elastically lightly pressing itself against the surface of the following segment, so that the gap remains covered when the adjacent segments change their relative positioning. For the airfoils said segment's contact surface against which the flap is pressing can be provided with a low friction surface coating and/or the air lubrication can be used for example by means of diverting some of the ambient air flow into the contact area between a segment and a flap. The hydrofoils can be provided with a surface treatment or coating suitable for operating with water lubrication. The surface of said flap lightly pressing against the segment can be provided with a similar coating. Alternatively the segments can be provided an elastic cover over both, the upper and lower blade surfaces, made for example from an elastomer material. A different implementation of the first embodiment, particularly well-suited for the marine propellers, is shown (FIG. 2), wherein the elastic plate (5) extends along the chord and mounted perpendicularly to said plate are the partition plates (6). This blade structure allows cross-sectional flexibility in combination with spanwise stiffness provided by the partition plates (6). Between said partition plates and attached to them are installed electro-active polymer segments (7) connected to the power circuit. The surfaces of the blade are covered by an elastic sheeting (8), such as made of an elastomer. Still another version of the first embodiment will be using the turn actuators at the hinges between the segments (1) in a manner similar to what is described in the fourth embodiment for turning the trailing flap, but in the first embodiment said turn actuators will be used for changing the relative planes of the adjacent segments thereby changing the shape of the blade. One more version of the first embodiment has bars made of smart memory alloys connecting the segments (1) with said bars bending according to the commands by the control system to change the relative planes of the adjacent segments, thereby changing the shape of the blade. There are pressure/flow sensors placed on the surface of the blades as well as the transmitters, such as for example infra-red light or radio to relay the sensor data as well as to provide the feedback to the control system regarding the blade parts actual positions.

Figure 3:
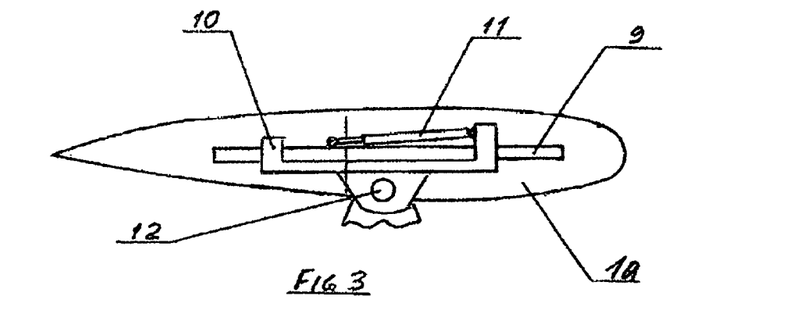
FIG. 3 is a view of the blade with pivoted support equipped with an actuator for dynamically moving the blade relative to the pivot and thus changing the blade's relative pivot point location.

Second Embodiment will comprise a blade either of a fixed cross-sectional shape or of variable shape (FIG. 3) mounted on both ends onto the support plates (9) which are slidably mounted onto a short pivoted tracks (10). On said pivoted (12) track are attached the corresponding ends of the suitable actuators (11) while the opposing ends of said actuators are attached to the carriages. The suitable fast acting actuators can be for example the electro-active polymer based or the piezo-electric with amplification actuators. It is possible that the carriages are mounted inside another pair of carriages with the actuators attached to the inner and outer carriages in the same manner as described above for the support plates (9) and a pivoted short track (10). The purpose of that is to have the carriages with actuators moving in a staggered manner to increase the distance of blade movement relative to the pivot point, because the actuators that are required for the airfoils with real time pivot point relative location variability have to be very fast acting, but typically have a short stroke—such as the piezo-electric crystal based actuators. The blade's translational movement relative to its pivot point will result in the tangential redistribution of its mass forward or backward which can be neutralized by the use of counterbalancing of such movements similar to what has been described in U.S. Pat. No. 8,540,485 and/or the patent application PCT/IL2013/050755 or by the use of other known counter-balancing and/or damping means.

Figure 4:
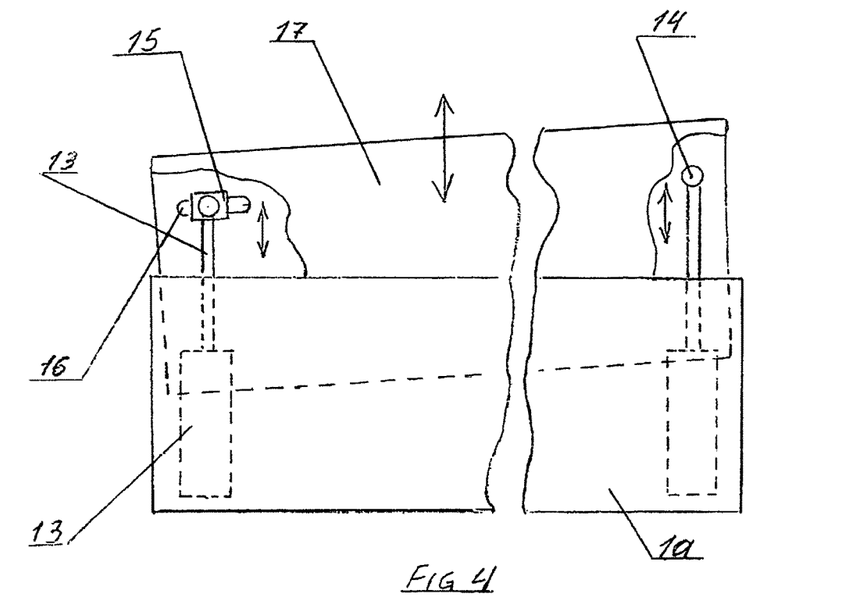
FIG. 4 depicts the blade shown from the top with an actuated trailing extension flap.

Third embodiment of the blade of this invention (FIG. 4) will comprise a blade either of a fixed shape or a flexible blade as described in the first embodiment. On the suitable elements of the blade structure there will be mounted 2 fast acting linear actuators (13) which are in turnable attachment to pins (14). On the left the pin (14) is mounted on movable support (15). Said support is movable along the short track (16) to accommodate the differential moves of the left and right sides of the trailing extension (17). There can be many other different design solutions for the simple task of extending and retracting the trailing extension which would still be within the scope and the spirit of this invention. The extension or retraction of said trailing extension will result in redistribution of its mass forward or backward which can be neutralized by the use of counterbalancing of such movements similar to what has been described in U.S. Pat. No. 8,540,485 and/or the patent application PCT/IL2013/050755 or by the use of other known counter-balancing and/or damping means.

Figure 5:
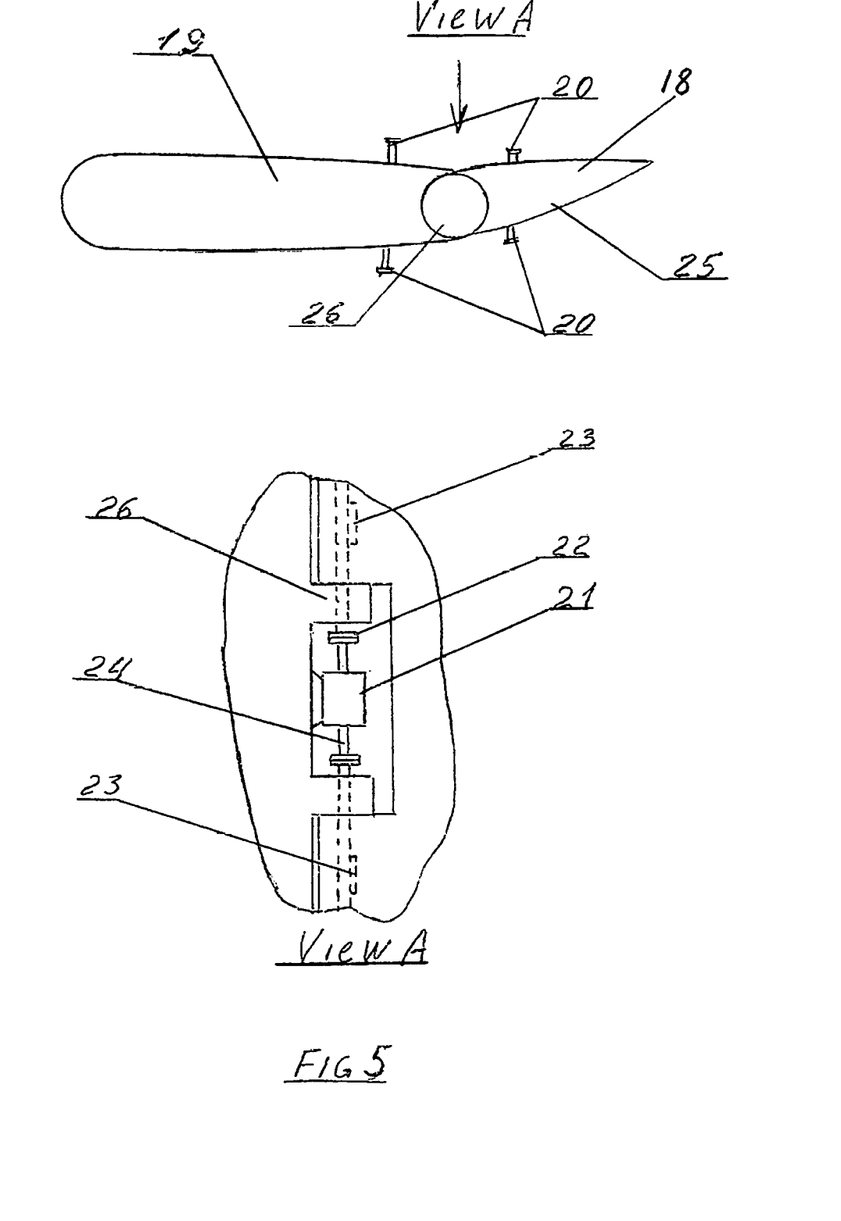
FIG. 5 is the side view of the blade with a turnable trailing edge flap.

Fourth embodiment of the blade of this invention (FIG. 5) will feature a turnable flap (18) attached to the body of the blade (19) by means of hinges. Along the ends of the flap and in corresponding locations of the body of the blade, stoppers with the dampeners (20) will be located to limit the maximum turn of the flap in both ways. Coaxially with the hinge (s) a fast acting turn actuator (21) with the clutches (22) is mounted. Keys (23) will assure that the flap (25) turns together with the shaft (24) in hinges (26). A miniature transmitter will be located on the flap, for example infra-red; for signaling flap's actual position to the control system. It would be desirable to have this turnable flap balanced around its pivot axis especially for the much faster aerial rotor applications.

Figure 6:
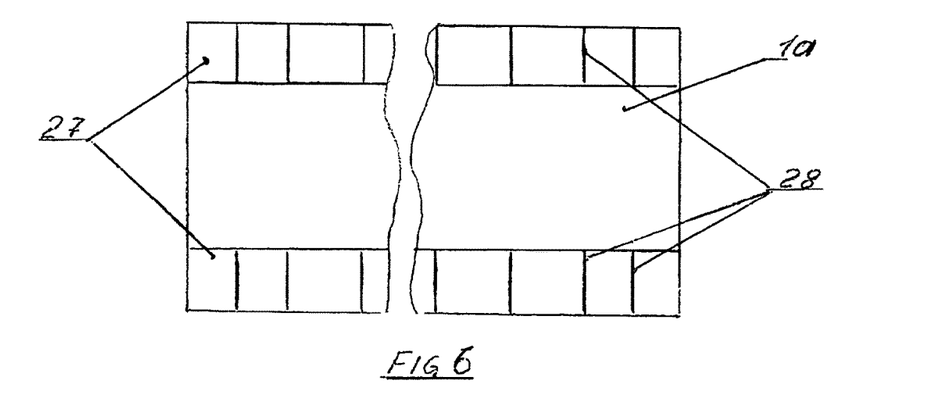
FIG. 6 is a view from the top of a blade with two flexible edges of differentially variable along the span stiffness oriented in opposite directions and suitable for reversing the trailing and leading edges.
Figure 7:
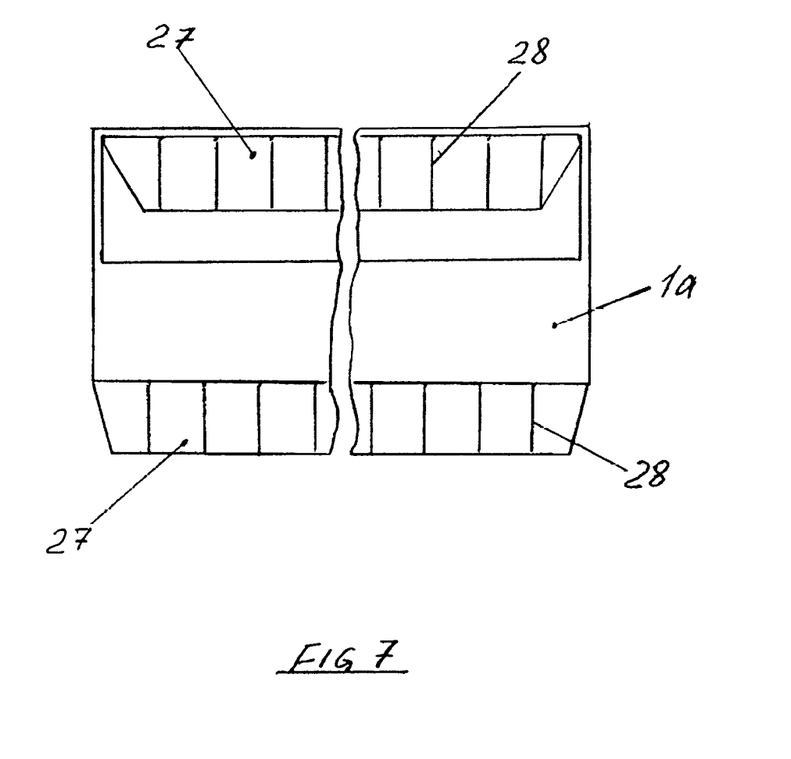
FIG. 7 is the view from the top of a blade with two variable edge flaps located at the opposing edges of the blade and operationally oriented in the same direction.

The fifth embodiment (FIG. 6) of the blade (1a) will comprise the flexible trailing edges (27) with reinforcing ribs (28) extending from the side where the flexible trailing edge is attached to the structure of the blade, to the free end of the flexible edge. Said reinforcing ribs (28) will be placed at predetermined distances from each other. Said ribs will be made of elastic material such as for example the kinds of plastics used in the plastic springs, elastic bronze alloys or spring steel. The ribs in one version of this embodiment are generally in the form of hollow tubing filled with oil or other incompressible fluid with no air pockets, hermetically sealed on one end and closed on the other end by a piston or, if practical for a given diameter of hollow tubing, flexible membrane suitable for withstanding high pressures, with said piston or membrane controllably, according to a predetermined mathematical function or formula describing the amount of movement in relation to time, moved by an actuator, such as for example piezo-electric or electro-active polymer based one, more or less inwards or outwards of the tubing's hollow with the required by the control system frequency or specifically on command by the control system. When the piston or membrane is pushed in—this will create high pressure inside the tubing's hollow, resulting in the tensile stress in its walls and, for certain kinds of tubing materials such as plastics, their significant radial expansion and therefore due to these factors the rib's increased stiffness and vice versa when the piston or membrane moves outward. Optionally said piston or membrane can be external to the hollow tubing of ribs (28) and its high pressure output would enter the hollow tubing via a suitable inlet or there will be an insert inside the hollow tubing, such as consisting of a suitable electro-active polymer changing its volume upon application of voltage and thereby changing pressure inside. Alternatively such reinforcing rib can comprise an elastic beam, made of the same kinds of materials as those listed above for the ribs, of elongated cross-sectional shape such as for example elliptical or oval mounted inside of round housing tube. When said beams are turned by the actuators relative to the plane of blade, their area moments of inertia relative to that plane and accordingly their stiffness will vary, possibly by several times if needed. These and other ways of implementing these reinforcing ribs of variable stiffness are described as applied to springs of various types and shapes in patent application "Smart Springs and their combinations", PCT/IL15/00021. The stiffness variation of reinforcing ribs (28) can be performed differentially along the blade span which will have effect on the shape of the vortex forming and its possibly moving spanwise along said flexible edge. Said flexible edge along the blade span can be provided on more than one location along the blade chord, such as for example (FIG. 6) along the opposing edges of the blade with opposing flexible edge orientations, defined as the direction from the side of it that is mounted to the free, movable side. This would be particularly useful for the cases where the operation in reverse airflow is required or in other cases where the current instantaneous trajectory position of the blade and its current pitch angle make reversing the leading and trailing edges advantageous. In that case the control system is making that determination and former trailing edge is made rigid, while the former leading edge is made appropriately flexible. Alternatively the flexible edges, depending on the type of operational movement that a blade is designed for, could be installed facing in the same direction (FIG. 7) either on the different sides relative to the blade pivot point or on the same side. In both cases they will require spanwise openings in the blade surface of predetermined, sufficient size for the non-leading, non-trailing edge located flexible edge to operate.

Figure 8:
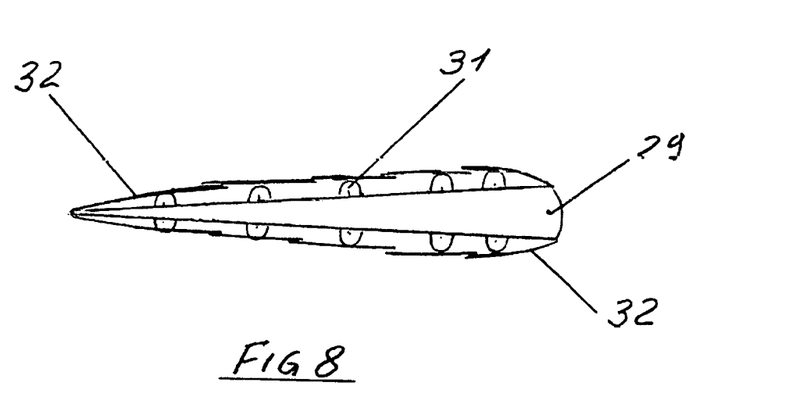
FIG. 8 is a side view of a blade with variable cross-sectional profile height.

For the sixth embodiment of this invention the blade will be provided with dynamic profile thickness variability in order to optimize the blade cross-sectional profile, and optionally spanwise profile as well, for the different operating conditions and regimes along the blade orbit within a revolution. This will also be needed for the blades of the fifth embodiment where the leading and trailing edges are reversible and the appropriate reshaping of the blade profile is called for to correspond to that reversal. The blade as shown on FIG. 8 will comprise a base which may be of fixed shape or variable shape as described above for the first embodiment (29) and a flexible cover (30) made of suitable material having the required degree of flexibility, stiffness, elasticity and resistance to fatigue such as for example graphene sheeting or carbon fiber sheeting for the aerial applications or the spring steel sheeting or elastic bronze alloys sheeting or carbon fiber sheeting for the marine propellers. Said sheeting would preferably be installed both on top and bottom of the base (29) and will be supported by a plurality of actuating elements (31) mounted on the base in a predetermined pattern and at a predetermined distance from each other. Said actuating elements could for example be memory alloy conical spirals able to change their shape between a cone when fully extended and a flat spiral when fully contracted with the control system individual positional control for each such element or a predetermined grouping of them such as a row attached to the same flat structural bar (33) extending along the span of the blade. While generally within one row of actuators they are to move by the same distance, but optionally such actuators in one row or grouping can be made to move differentially along the blade span thereby also providing a variability of blade's profile spanwise. Another way of implementing such actuating rows is by means of using an inflatable, pneumatically for aerial rotors or either pneumatically or hydraulically for marine propellers, and expandable length of hose mounted on base (29) and attached to flat structural bar (33). Alternatively such actuating elements for the aerial applications could be the piezo-electric actuators with amplifiers which are much faster acting and can be used for dynamically changing the shape of said sheeting within each rotor revolution. As the cross-sectional profile curve of said sheeting changes, the length of said curve will also change. Said length change can be allowed to take place by means of using sheeting divided into partially overlapping strips (32) of predetermined width. As the height difference between adjacent strips varies the change in said curve's length will be provided for by means of changing the amounts of overlap between the adjacent strips. Alternatively groove and tongue connections along the spans of the adjacent strips can be used. If a sheeting strip covers more than one row of actuated support, the sheeting would be attached to one said row and provided with the known means of facilitating its movement over the other rows of said supports such as those using suitable flexible tracks affixed to sheeting and either rollers or sliders mounted on the actuated supports. Optionally a cover made of elastomer able to change length (not shown) can be installed over the sheeting to cover the edges of sheeting strips. There is a great variety of such actuated supports and other actuated means which can be used for flexing said sheeting and mutatis mutandim they are all considered to be within the spirit and scope of this invention. The second version of the sixth embodiment is particularly suitable for the marine propeller blades. It will comprise the pads of suitable electo-active polymers (not shown) or other suitable materials able to change their volume and/or shape in a predetermined way and amount when voltage is applied, said pads affixed on either the fixed base or flexible base (29), possibly on both surfaces of it and optionally having a protective cover either consisting of one piece sheet or a number of possibly partially overlapping strips, made for example of elastomer, extending over their combined surface on each surface of the blade that has said pads installed. For both versions of the sixth embodiment the movement of strips of sheeting or the entire solid sheeting is facilitated by lubrication of supporting them surfaces; seawater lubrication for the marine blades and air lubrication for the aerial blades. The lubricating water or air flow respectively can be either forced or diverted ambient flow about the blades.

For the seventh embodiment of the blade of present invention it shall be provided with controllable "on" or "off" largely unobstructed flow permeability over much of its surface for the purpose of mitigating the effects of very strong cross-trajectory flows encountered in some otherwise promising trajectories. These flows produce very significant impulses of negative lift or negative thrust respectively, but there are certain other circumstances where said permeability provided upon the control system command will be highly useful. The blade's (FIG. 9) both surfaces will have matching in terms of size and location orifices (34) covered by blinds-like sets of turnable strips (35) which can extend along the blade's span or perpendicularly to it which is preferable as it likely would least interfere with the flows across the blade. Said blinds covered orifices in the surfaces will have channel walls (36) between them to direct and laterally contain the flow through the blade between said orifices. The strips' pivot axis (37) in said blinds can have gears or gear sectors (38), which will be miniature where appropriate, preferably on both ends of the strips to prevent twisting them, with said gears/gear sectors being in mesh with an actuator driven rack (39) or toothed belt. For lightweight, aerial applications said strips can be held at both ends by string-like torsions instead of the pivot axis and can be connected near the edge by a common push/pull link movable by a linear actuator. So as to cancel out any aerodynamic forces, produced by a number of strips being turned together, half of them are optionally turned by one link in one direction and the other half of them by another link in another direction. Said actuator shall have a locking capability or a standalone locking mechanism of a known kind (not shown) needs to be operatively connected with said push or pull link or rack (39). Alternatively said strips can be allowed to be turned into the open position by the flows by releasing the actuator lock or said standalone locking mechanism in anticipation of said flows and then returned into the closed position by the actuated link or the by the above mentioned string-like torsions of turn stiffness sufficient for that.

6. SKETCHES AND DIAGRAMS

Provided separately.

7. OPERATION

In operation the blade of the first embodiment (FIG. 1) will flex its shape in accordance with the operational mode as selected by the control system 2A. The flexing will occur by means of the actuators (3) located in the gaps between the segments (1) changing the relative distance between their attachment points on the adjacent segments (1), according to the commands by the control system 2A, thereby changing the segments relative angular positioning and thus changing the shape of the blade. By means of the coordinated by the control system actuator action the blade will perform flexing motion such as for instance the fishtail movement mostly by its end segments or the undulating thruster-like movement or continuously assume different curved profiles for the optimum lift/thrust generation most suitable for the current moment's operating environment. A different version of this embodiment shown in (FIG. 2) will operate as follows; control system 6A will activate in a coordinated manner the electro-active polymer segments (7) which will expand and contract, pushing and pulling on the partition plates (6) thus causing the elastic plate (5) to flex and thereby causing the whole blade to flex as directed by the control system. The blade may optionally use the pressure/flow sensors located on it to keep the control system fully aware of the current flows about the blade. It will transmit that data to the receiver(s) located elsewhere on the propeller/rotor structure, optionally together with the signals such as infra-red light for the purpose of determining the blade parts' exact positioning as a feedback to the control system 6A.

In operation of the blade of the second embodiment, (FIG. 3) upon command by the control system the actuators will be changing the distance between their attachment points at the pivoted short track (10) and the blade carriage thereby moving the carriage and thus the blade mounted on it, relative to the said pivot point (12) which will produce a change in the relative sizes of the leading edge and trailing edge vortexes. If more than one carriage is used for the staggered movement then the actuators will implement a corresponding movement between the nested carriages. As described for the first embodiment optionally the blade pressure/flow data and positional information will be transmitted to the control system.

For the third embodiment (FIG. 4) the actuators (13) will move on command by the control system thereby moving the pins (14) mounted on the movable support (15) thereby moving the trailing extension (17) inward or outward relative to the rear edge of the blade. The actuators (13) can move differentially thereby providing different positioning to the pins (14) and thus will have the right and the left corners of the trailing extension positioned at different distances from the rear edge of the blade. The movement of the trailing extension can be used to shed, when needed, the trailing edge vortex generated along its rear edge or to control the trailing edge vortex's size. Optionally the trailing extension's positional information and a data from any pressure/flow sensor(s) on it can be transmitted to the control system as described above.

For the fourth embodiment (FIG. 6) of the blade of the present invention, the turnable flap, when the control system disengages the clutch (22) will be released to move freely and will be pushed by the flow to either side of the blade shedding the trailing edge vortex or letting the undesirable powerful flows which appear at certain trajectory inflection points to pass into the downwash without creating negative lift and other adverse consequences. Afterward upon the command of the control system the actuator (21) and the clutch (22) will be re-engaged aligning the flap with the rest of the blade or positioning it at some other control system directed angle. The powered flap turning will be possible to use to produce the flap movement for the fishtail propulsion or to control the genesis of the trailing edge vortex.

The fifth embodiment (FIG. 5) of the blade of this invention features the flexible trailing edges (27) for which the stiffness of the supporting ribs (28) is dynamically adjustable in real time—that is to be used to control and optimize the instantaneous geometry of the curvature formed by the flexible edges in order to optimize the vorticity effects produced thus maximizing the blade's performance while operating at various regime parameters such as rpm, the oncoming flow's speed and direction, the geometry of the part of the blade trajectory being traversed and the current angle of attack (if applicable) in conjunction with the blade's instantaneous current overall cross-sectional shape. Said dynamic stiffness variation can be implemented differentially along the span of the blade thereby precisely controlling the vortex being generated, its shape and movement along the span and the lift or propulsive force produced. As more than one flexible edge can be present on the blade of this embodiment, the vortex shedding timing by the control system at the upstream flexible edge will take into account its effect on the downstream flexible edge's operation.

The operation of the blade of sixth embodiment is adequately described in the Description Section and will not be re-iterated here but is included by way of reference, as if fully set forth.

Figure 9:
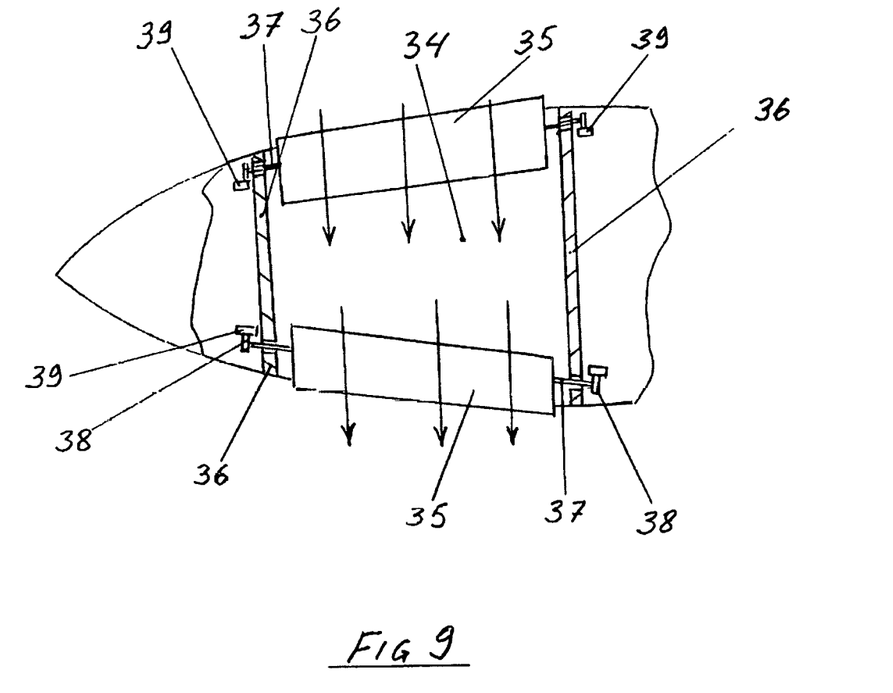
FIG. 9 is the partial side view of a blade with "on" or "off" flow permeability.

The blade of the seventh embodiment is to operate as follows; upon command by the control system the locking mechanism (not shown) blocking the movement of either the rack (39) or common link connected to the turnable strips (35) or the linear actuator (not shown) connected to said link is released and the strips (35) are subsequently turned by the flows in the predetermined direction on the side of the blade where the high dynamic pressure is expected. Subsequently the same will be taking place on the opposite surface of the blade at the matching orifice there, when the dynamic pressure reaches through the blade channel the turnable strips there. As the result the flow passes across the blade through the channel between the matched orifices which have been opened. Upon the next command of the control system which may be triggered by the change of the dynamic pressure or the blade passing into another part of its orbit, the actuator moves said rack (39) or common link returning said strips into their original position and the either the actuator or the locking mechanism prevents any movement by the strips until next control system command. For the version of the seventh embodiment with the turnable strips (35) held by the torsions, the control systems role can be reduced to just controlling the locking mechanisms so as to prevent the opening of the orifices when it is not desirable or at the location on the surface of the blade where it is not currently desirable, whereas the strips will be turned by the flow's dynamic pressure thus opening the orifices. Afterwards the strips will be returned by the torsions to their original positions closing the orifices when the dynamic pressure subsides to the predetermined level. Another possibility is to have said strips turned either way by the actuator on command by the control system without any reliance on the flows acting on the strips; that would allow the anticipatory opening and closing of said orifices preparing for the onset of flow and/or of dynamic pressure changes before said onset.

The invention claimed is:

1. A method for altering fluid dynamic properties of a cycloidal blade, the method comprising:
    providing a cycloidal blade having:
        a collective blade surface formed from a series of separately orientable, flow surfaces,
        a plurality of independently operable actuators in communication with the flow surfaces, the actuators operative to orient one or more of the flow surfaces in accordance with commands received from a controlsystem; and
    actuating one or more of the actuators within a revolution of the blade.

2. The method of claim 1, wherein the flow surfaces are implemented as articulated, blade segments.

3. The method of claim 2 wherein the articulated, blade segments are implemented as foil blade segments.

4. The method of claim 3 wherein the independently operable actuators are selected from the group consisting of electro-magnetic actuators, electro-active polymer actuators, piezo electric actuators, and smart memory alloy-based actuators.

5. The method of claim 1, further comprising a flexible core supporting the series of separately orientable, flow surfaces.

6. The method of claim 5, wherein the flow surfaces are implemented as plates.

7. The method of claim 6, wherein the plates are implemented as foil parts.

8. The method of claim 7, wherein the independently operable actuators are implemented as electro-active polymer segments.

\* \* \* \* \*